Jan. 30, 1945.  S. D. ROBINS  2,368,159
AIRCRAFT LANDING PLATFORM
Filed July 20, 1943
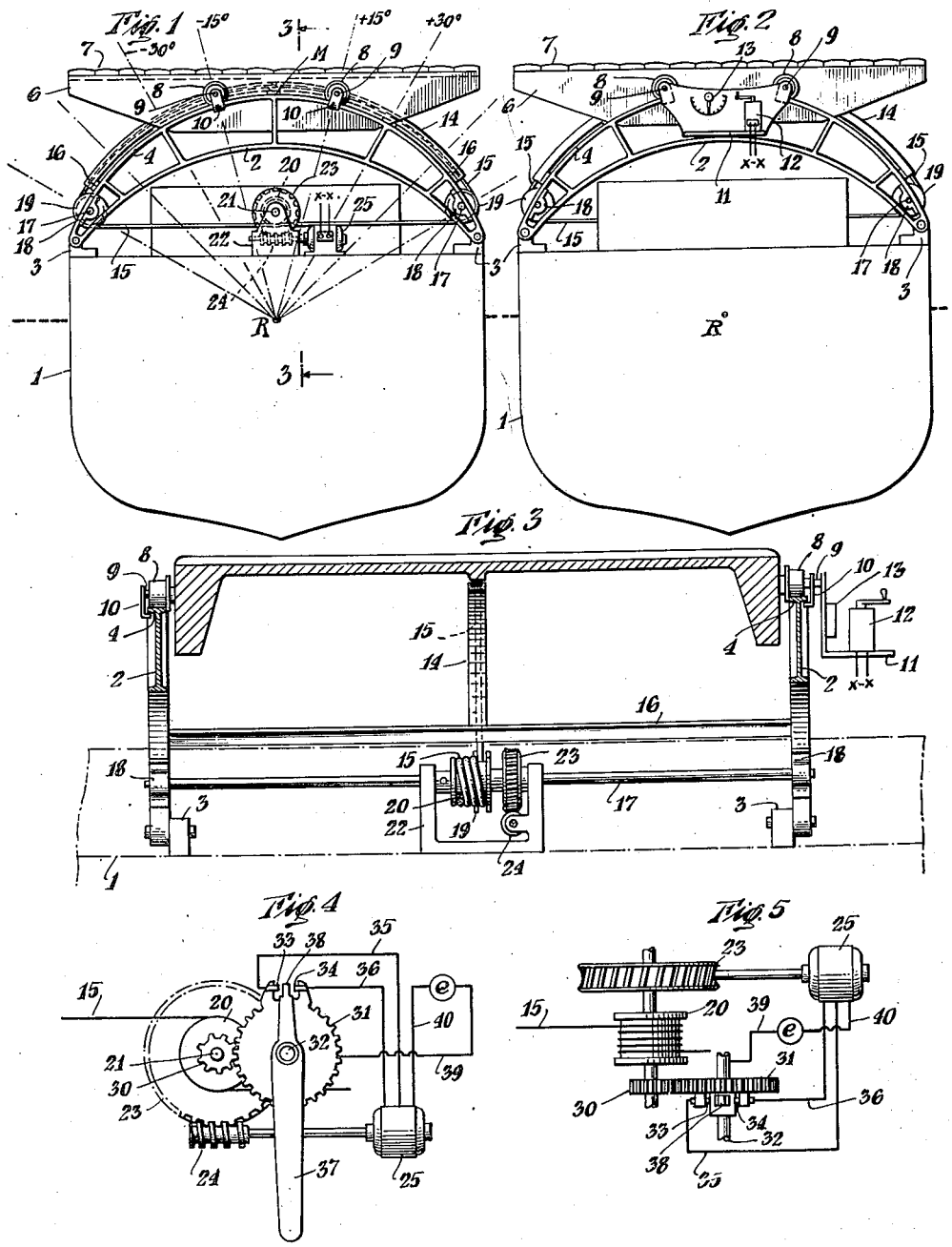
INVENTOR.
Samuel Davis Robins
BY
Thos. R. Mac Donald
ATTORNEY Patented Jan. 30, 1945

2,368,159

UNITED STATES PATENT OFFICE 2,368,159

AIRCRAFT LANDING PLATFORM

Samuel Davis Robins, New York, N. Y.

Application July 20, 1943, Serial No. 495,428

7 Claims. (Cl. 114—43.5)

This invention relates to certain new and useful improvements in aircraft landing platforms for marine vessels.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serve to explain the principles of the invention.

Objects of this invention are to provide an aircraft landing platform for marine vessels which may be maintained substantially level crosswise of the vessel within the ordinary range of roll angles of the vessel thereby to minimize the possibility of upset of aircraft when landing thereon; which may be controlled so as to have substantially no lateral component of velocity as the vessel rolls; which will not require utilization of any substantial amount of the hull space of the vessel; which may be installed with facility and convenience on most vessels; which may be fabricated at relatively low cost; and, which will facilitate the use of helicopter aircraft with small vessels of limited free deck area.

Of the drawing:

Fig. 1 is a part sectional view of a typical and illustrative embodiment of this invention, the view showing a marine vessel equipped with an aircraft landing platform in accordance with this invention, the section plane being normal to the longitudinal axis of the vessel and adjacent one end of the landing platform;

Fig. 2 is a view similar to that of Fig. 1 but viewed from the opposite direction;

Fig. 3 is a view in section taken along the line 3—3 of Fig. 1;

Fig. 4 is a somewhat diagrammatic view in elevation of a form of automatic platform leveling apparatus; and Fig. 5 is a view in top plan of the apparatus of Fig. 4.

To the accomplishment of the foregoing ends and objects and in accordance with this invention, a wheeled carriage providing a landing and take-off surface is supported above the deck of the vessel upon a rigid structural framework providing an arcuate track which is concentric or substantially concentric with the roll axis of the vessel and along which the carriage is adapted to travel back and forth.

In order that the landing platform may be applied with the utmost of facility to existing ships, or to new ships, without major reconstruction or loss of normally available cargo space, the supporting structural framework is located at a suitable available space over the deck, and is firmly anchored to the hull structure.

By reason of the concentricity of the arcuate track with the roll axis of the vessel, the vessel and carriage may be made to move relative to each other so as to maintain the flight surface horizontal crosswise of the vessel as it rolls. To this end, means are provided for driving the platform along the arcuate track in a direction opposite to the direction of roll and at a controlled speed preferably commensurate with the rolling speed, so as to maintain the platform horizontal, crosswise of the vessel as it rolls.

It will be understood that the foregoing general description and the following detailed description as well are exemplary and explanatory but are not restrictive of the invention.

Referring now more particularly to the accompanying drawing, a marine vessel 1 is provided with a pair of trusses 2 each preferably pin connected at either end to pedestals 3 in turn secured to the hull of the vessel 1.

The trusses 2 have arcuate top rails 4 each concentric or substantially concentric with the normal roll axis R of the vessel when the latter is preferably in a loaded condition, the rails 4 together providing an arcuate track extending across the vessel.

A wheeled carriage 6 preferably having a cushioned flight surface 7, is supported between the trusses 2 on the rails 4 by means of flanged wheels 8 which engage the rails 4 and are adapted to roll thereon.

The wheels 8 are journalled on shafts 9 fixed to the platform 6 and equipped with flanged guard members 10 secured thereto which coact with the rails 4 so as to prevent derailing of the carriage.

At one end of the carriage 6 there is provided a control platform 11 which is secured to the shafts 9 and is equipped with a motor controller 12 and a pendulum 13, for a purpose to be described more fully hereinafter.

Positioned substantially midway between the trusses 2 is an arcuate cable guide member 14, preferably of channel shape, in which is lodged a cable 15, preferably continuous, fastened securely to the underside of the carriage 6 substantially centrally thereof. The guide member 14 is concentric or substantially concentric with the roll axis of the vessel 1 and has a radius of curvature preferably corresponding to that of the path to be followed by the axes of the wheels 8. Beams 16 support the guide member 14 at its ends and are each secured at either end to the trusses 2 to brace the latter.

Parallel shafts 17 are positioned at either side of the vessel 1 between the trusses 2 and are supported at either end in journal members 18 carried by the trusses 2. Each of the shafts 17 is provided intermediate its ends with a sheave 19 aligned with the guide member 14 and serving to conduct opposite flights of the cable 15 substantially tangentially from either end of the guide member and across the deck of the vessel to a winding drum 20 located preferably midway of the vessel.

The winding drum 20 is secured to a longitudinal shaft 21, journalled for rotation in a fixture 22 so that rotation of the drum in either direction will be transmitted by the cable 15 wound therearound, to the carriage 6 and thereby move the carriage crosswise of the ship in one direction or the other as the case may be from its normal midposition as shown in Fig. 1. Grooves (not shown) may be provided, if desired, in the drum surface to facilitate winding and unwinding of the respective cable flights from the drum.

Means are provided for driving the winding drum 20 and hence driving the carriage 6 along the track formed by the rails 4 in either direction and at a controlled speed so that the carriage may be maintained in the desired horizontal attitude crosswise of the ship as the latter rolls. It will be understood that the motion of, for example, the midpoint M of the rail 4 above the roll axis R of the vessel is substantially simple harmonic and that the maximum value of the lateral component of velocity will occur at the midroll position. The embodied driving means is therefore preferably such as to permit the carriage 6 to be moved in simple harmonic motion opposite in sense and equal in magnitude to that of the vessel along its path of movement. As here preferably embodied, a worm wheel 23 carried on the drum shaft 21 is adapted to be driven in either direction through a worm gear 24 by means of a reversible prime mover such as the electric motor 25 of suitable speed range.

The motor 25 to which power may be supplied from batteries (not shown) or from some other suitable source such as the ship's electric generating system, is electrically connected to the manually operated controller 12, the necessary electrical connections being diagrammatically indicated by the leads designated $x$—$x$ from the controller 12 and the motor 25. The controller 12 may be of any suitable type enabling acceleration, deceleration and reversing of the motor 25 with sufficient flexibility of torque and speed range to permit matching the carriage speed to the rolling speed of the vessel to the end that the carriage may be maintained in the desired horizontal attitude throughout the roll of the vessel.

For the guidance of the operator in maintaining the platform in the desired attitude, the pendulum indicator 13 is provided, the indicator being suitably inscribed to read in degrees of list from the midposition, or horizon sighting may be followed.

Thus, it will be observed that as the vessel rolls from the midposition, the operator standing on the platform 11 may, by suitable control of the motor 25, through the medium of the controller 12, drive the winding drum 20 in either direction, at the required speed. The motion of the winding drum serves to wind one flight of the cable 15 thereon while the other unwinds, the cable pull being applied to the wheeled carriage 6 which is thereby moved the required amount relative to the vessel on the track formed by the rails 4. It will also be observed that because the vessel 1 and the carriage 6 have the same rotational axis R, the carriage 6 will have no lateral component of velocity relative to an aircraft landing on or taking off therefrom. This is of particular advantage in connection with helicopter aircraft since a sideways movement of the platform in the order of three or four miles per hour may be sufficient to upset the aircraft at the moment of landing. Through the provision of the cushioned surface 7 of the landing carriage, shocks incident to hard landings may be absorbed in part without placing excessive stress on the supporting framework, or the vessel's hull.

Referring now more particularly to Figs. 4 and 5, there is shown means for automatically controlling the motor 25 to maintain the carriage 6 in the desired horizontal attitude. As there embodied, the drum shaft 21 carries at one end a spur gear 30 of relatively small diameter for driving a spur gear 31 of relatively larger diameter carried on a parallel shaft 32 preferably located amidships coaxial with roll axis R. The gear 31 is provided at its top with a pair of contacts 33 and 34, respectively, in opposed closely spaced relation, each contact being suitably electrically insulated from the gear 31 and connected by flexible leads 35 and 36, respectively, to the driving motor 25.

A pendulum 37 is journalled on the shaft and is provided with a contact arm 38 extending upwardly from the shaft 37 between the contacts 33 and 34 midway thereof and in closely spaced relation thereto. A lead 39 connects the shaft 32 to one terminal of a source e of E. M. F. whose other terminal is connected by a lead 40 to the motor 25. It will be understood that the lead 39 forms a common conductor through the pendulum 37 in the motor circuit for coaction in a known manner with the leads 35 and 36 for reversing the motor 25.

With the vessel in its neutral position as in Fig. 1, the pendulum 37 hangs vertically with the contact arm 38 midway of and in spaced relation to the contacts 33 and 34. Assuming a roll of the vessel to the right as viewed in Fig. 1, the arm 38 would substantially immediately engage the contact 33 closing the circuit through motor 25 in one direction and energizing the motor. As the motor 25 drives the worm wheel 23 and shaft 21 in a clockwise direction, as viewed in Fig. 4, thus exerting pull through the left hand flight of the cable 15 on the carriage 6 to maintain it in its horizontal attitude, the spur gear 31 is rotated in a counter-clockwise direction. If the vessel rolls to the right through an angle of $+15°$, for example, shown in Fig. 1, the contact arm 38 will maintain the motor circuit closed until the gear 31 has completed a counter-clockwise movement through the same angle. The pendulum 37 will then hang vertically between the contacts 33 and 34, the motor circuit will be interrupted and relative movement of the vessel and carriage will cease.

It will be understood that the total required angular movement of the drum 20 in countering a given angular movement of the vessel will depend on such factors as the diameter of the winding drum and the length of the arcuate path of relative movement of the carriage on its track which in turn is a function of the radius of curvature of the path. Hence a ratio of diameters for the gears 30 and 31 must be chosen which will effect the angular movement of the gear 31 required to permit the pendulum 37 to hang vertically when the vessel has listed any given angle and come to rest.

As the vessel commences its return movement, the contact arm 38 will substantially immediately engage the opposite contact 34 thus reversing the flow of current in the motor circuit and driving the motor 25 in the opposite direction. The sequence continues in obvious fashion throughout the full rolling cycle. Suitable provision in the form of a series of time relay switches in the motor circuit may be made as required for controlling the motor speed, much as in elevator practice, so as to proportion the relative angular velocity and acceleration of the carriage over the path of movement to that of the vessel by varying the motor speed commensurate with the severity of the roll having regard to the fact that the roll period T being substantially constant for a given vessel, the maximum angular velocity at mid-roll position will increase with the degree of roll.

The invention in its broader aspects is not limited to the specific mechanisms shown and described but departures may be made therefrom within the scope of the accompanying claims without departing from the principles of the invention and without sacrificing its chief advantages.

What is claimed is:

1. The combination with a marine vessel of: a landing platform for aircraft comprising an arcuate track topside of said vessel and substantially concentric with the roll axis of said vessel; a mobile carriage providing a flight deck for aircraft mounted on said track for back and forth movement thereon; and, means for driving said carriage.

2. The combination with a marine vessel of: a landing platform for aircraft comprising an arcuate track located outside the vessel's hull and substantially concentric with the roll axis of the vessel; a mobile carriage having a cushioned upper surface providing a flight deck for aircraft mounted on said track for back and forth movement thereon; and, means for driving said carriage in either direction on said track.

3. The combination with a marine vessel of: a landing platform for aircraft comprising an arcuate track located outside the vessel's hull and substantially concentric with the roll axis of the vessel; a mobile carriage providing a flight deck for aircraft mounted on said track for back and forth movement thereon; means for driving said carriage in either direction on said track, said means comprising a prime mover on said vessel for motivating said carriage; and control means for said prime mover.

4. The combination with a marine vessel of: a landing platform for aircraft comprising an arcuate track outside the vessel's hull and substantially concentric with the roll axis of the vessel; a mobile carriage providing a flight deck for aircraft mounted on said track for back and forth movement thereon; means for driving said carriage in either direction on said track; and means supported by said carriage for controlling said driving means.

5. The combination with a marine vessel of: a landing platform for aircraft comprising an arcuate track outside the vessel's hull and substantially concentric with the roll axis of the vessel; a mobile carriage providing a flight deck for aircraft mounted on said track for back and forth movement thereon; means for driving said carriage in either direction on said track; and manually operated means supported by said carriage for controlling said driving means.

6. The combination with a marine vessel of: a landing platform for aircraft comprising a structural framework positioned substantially wholly outside the hull of the vessel and overlying a topside area of the vessel, said framework having arcuate parallel rails substantially concentric with the roll axis of the vessel; a mobile wheeled carriage providing a flight deck for aircraft mounted on said rails for back and forth movement thereon; an arcuate cable guide member positioned between said vessel and said carriage in substantially concentric relation to the roll axis of said ship; guide sheaves at either end of said guide member; and, means for driving said carriage in either direction on said rails comprising a winding drum on said vessel, a cable in said guide member fastened to said carriage extending in either direction therefrom over said guide sheaves to and around said winding drum, a reversible prime mover for rotating said winding drum, and means for controlling the speed of and reversing said prime mover.

7. The combination with a marine vessel of: an aircraft landing platform comprising an arcuate track overlying a topside area of the vessel in substantially concentric relation to the roll axis of the vessel; a mobile carriage providing a landing platform for aircraft mounted on said track for back and forth movement; means for driving said carriage in either direction on said track at a speed commensurate with the rolling speed of the vessel; and means responsive to the roll of said vessel for controlling said driving means so as to maintain said platform horizontal crosswise of the vessel as the vessel rolls.

SAMUEL DAVIS ROBINS.